Nov. 27, 1962  C. E. JAHNIG  3,066,017
CONTROL OF FLOW OF PARTICULATE SOLIDS
Filed July 28, 1953
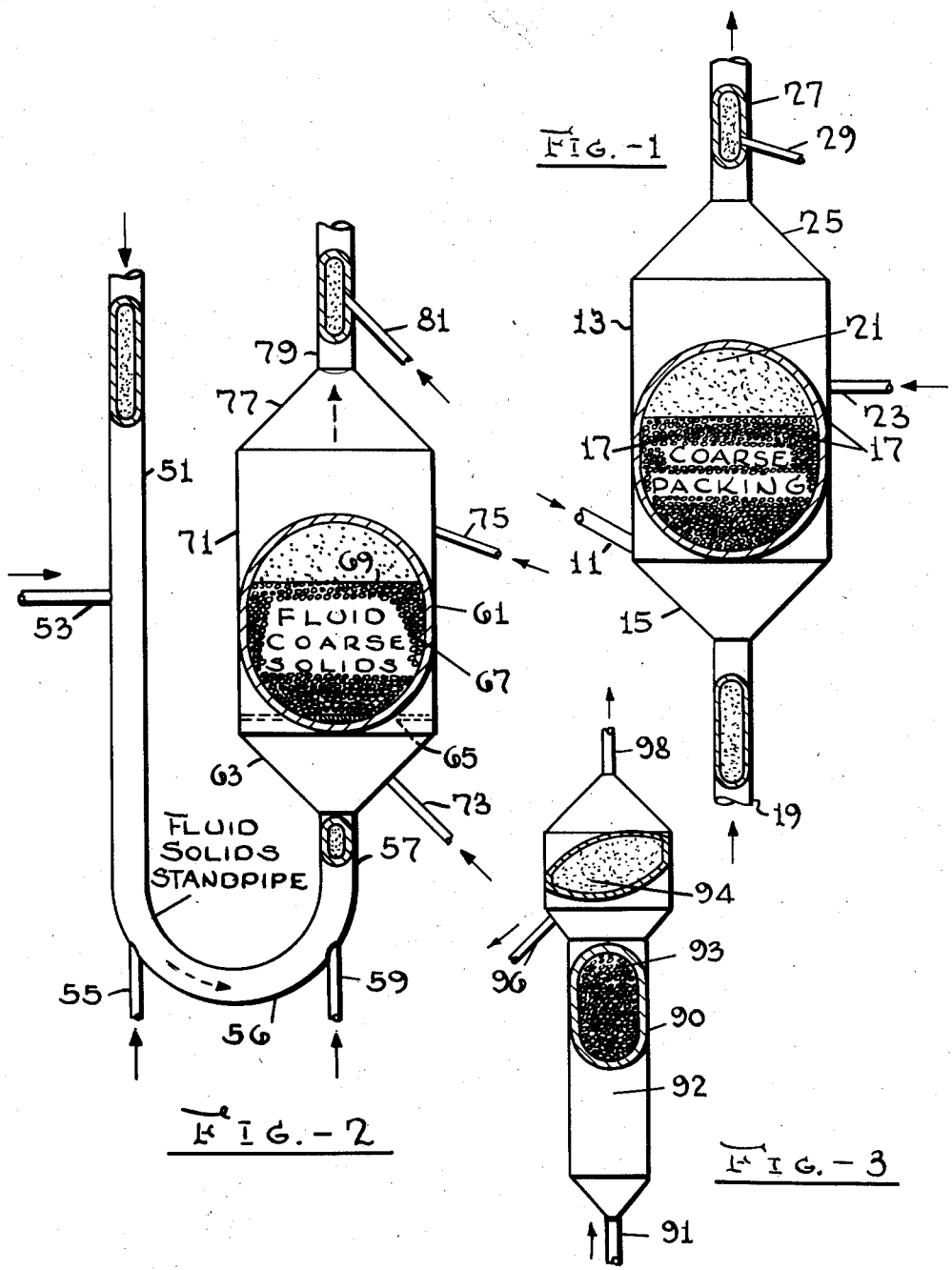
Charles E. Jahnig  Inventor United States Patent Office 3,066,017
Patented Nov. 27, 1962

3,066,017
CONTROL OF FLOW OF PARTICULATE SOLIDS
Charles E. Jahnig, Red Bank, N.J., assignor to Esso Research and Engineering Company, a corporation of Delaware
Filed July 28, 1953, Ser. No. 370,810
2 Claims. (Cl. 23—288)

The present invention relates to the control of flow of particulate and particularly to the control of the flow of fluidized particulate solids. The invention is well adapted for use in solids flow at relatively low throughput rates as well as at very high flow rates. The invention is adapted especially for the control of flow of a stream of finely divided solids, e.g. of average particles size below 300 or 400 microns average diameter, though it is not necessarily limited thereto.

In the prior art, the fluidized solids technique has been applied to numerous industrial processes including the cracking of petroleum fractions by use of fluidized catalyst, processing of minerals, conversion of finely divided coal to liquid and other products, and the like. In these processes, a mass of particulate solids is fluidized by passing upwardly therethrough a gasiform fluid. The fluid is fed at such a rate as to produce a dense turbulent mass or phase of solids resembling a boiling liquid. This so-called dense phase is separated from an overhead disperse phase of the particles by a more or less distinct interface.

In a process employing the fluidized solids technique, fluistatic pressures can be established and utilized to convey masses of such solids from place to place, much as liquids are caused to flow. Thus a fluistatic head, closely analogous to a hydraulic head, can be established in a standpipe or column containing the fluidized particles. The flow of solids from the bottom thereof may be regulated by a valve or equivalent, or by an opposing or balancing column, much as the flow of water or other liquid would be regulated.

While valve controls are widely used for governing movements of fluidized solids, there are sometimes objections to their use. Fluidized solids are frequently used or processed at very high temperatures in industrial systems, e.g. in the gasification of coke. Under such high temperature conditions, with fine solid particles present, valves are sometimes difficult to operate and maintain, especially at low flow rates where close control is needed. They are also sometimes required to operate at high pressure drop. Wear, erosion of the control valves, or corrosion may then be rapid. Finely divided solids sift into movable parts, increasing the maintenance problem. When valves are opened only slightly for low feed rates, bridging, plugging and other difficulties may cause erratic operation.

According to the present invention, masses or beds of relatively coarse particulate solid materials are utilized to replace and/or to supplement conventional valves for controlling the flow of relatively finely divided solid particles. By relatively coarse, it is intended to mean particles which are substantially larger than the fine particles or the larger of the fine particles. Thus with fine particles of 40 to 80 microns, the relatively coarse particles might have an average diameter of at least 100 microns and usually would be coarser, e.g. 300 to 400 microns or larger. Thus the ratio of sizes of coarse solids to finely divided solids is at least 400 to 80.

The method or process of this invention is applicable to various systems and apparatus as well as to various types of industrial processes utilizing finely divided solids where flow rate control is needed. By passing a stream of fine particles through a bed of coarser solids, and by appropriate control of aerating gas flow, the feed or flow rates of the finely divided solids may be quite accurately and efficiently regulated. Other features of the invention provide for operation of a middle column of the coarse solid particles as a check valve, or as a pressure reducing system. Other useful applications will be apparent to those skilled in the art.

Several embodiments of the invention are illustrated in the annexed drawing which forms a part of this specification. Referring to said drawing:

FIG. 1 shows diagrammatically a system wherein a mass of coarse solids is used to control the rate of feed of a stream of finely divided solid particles.

FIG. 2 shows diagrammatically a system wherein a mass of fluidized solids of relatively large particle size is used as a check valve to prevent reversal of flow of finely divided solid particles under fluistatic pressure.

FIG. 3 shows a system which is adapted to be used for depressuring fluidized solids.

Referring first to FIG. 1, an embodiment of the invention is shown wherein an upflowing stream of finely divided aerated particulate solids enters an upflow column constituting a flow regulator, through inlet 11. A source of gas, steam or other gasiform fluid keeps the solids mobile. The stream of solids enters into a vessel 13 which constitutes a conduit section of enlarged cross-section, having a flaring bottom inlet 15, preferably frusto-conical in shape.

The conduit or vessel is filled to at least part of its height with coarse solids 17 which may constitute a packing material. These may be solid particles or pieces of various sizes and shapes. Metal balls, shot, Raschig rings, Berl saddles, granules, beads, and the like, of any suitable material that will not abrade easily and does not exert an undesired chemical or catalytic action may be employed. These ordinarily will be too coarse, in this example, to be fluidized, although they may be lifted somewhat to increase interstitial spacing as the gas flow increases. The arrangement is such that these solids cannot plug inlet 11, and a screen or grid may be used to prevent the coarse solids from falling into it. The solid packing material is such that the finely divided solid particles entering through inlet 11 may pass through the interstitial spaces between coarse particles. These coarse particles exert a frictional drag, depending upon the flow rate and spacing between the coarse particles. The latter aeration is controlled by varying the amount of gas flowing. Thus, increased aeration results in greater spacing between particles, which gives higher flow rate of fine solids.

The gasiform fluid conveying the finely divided solids into and through inlet 11 may be adequate by itself to carry them through and out of the packing 17. Otherwise auxiliary gas, steam or the like may be introduced into the packed portion of conduit or vessel 13 by appropriate means such as inlet 19. The amount and velocity of gas or gasiform fluid flowing in inlet 11 may be varied to control the amount of finely divided solids being passed through the packed bed or the volume and velocity of gas entering through inlet 19 may be regulated, or both. Gas requirements obviously depend upon the particle size of the finely divided solids as well as upon the arrangement, size and interstitial spacing of the coarse solids which constitute the bed or packing 17.

The finely divided solids passing through bed 17 enter an upper zone or portion 21 of vessel 13, which is relatively free of coarse solids. Vessel diameter may be increased in this zone, if desired, to permit lower linear gas velocity. The cross-sectional area of the vessel 13 is preferably substantially greater than that of inlet 11, to give a low enough velocity so that the coarse solids are not carried out of vessel 13. Also, for this purpose a screen can be placed over the outlet from this vessel, if desired. The rate of flow of the finely divided solids out of zone 21 may be further varied by control of a gas inlet 23, above the packed bed 17. The upper portion of vessel or conduit 13 is preferably reduced or necked down, e.g. in frusto-conical form, as indicated at 25 to join outlet 27 which is of substantially smaller cross-sectional area than vessel 13 or the disperse phase zone 21. Hence, flow velocity in the outlet is increased above that in zone 13. Outlet 27 leads the stream of finely divided particles to a point of use or disposal not shown.

The solids concentration in outlet 27 obviously is regulated by the total input gas rate through inlets 11, 19 and 23, but if greater disperson is needed, additional carrying gas or gasiform fluid may be introduced through a line 29. Additional inlets for carrying fluid may be provided at desired points as will be obvious.

The system of FIG. 1 can be utilized to carry finely divided solids from inlet 11 to outlet 27 at a much slower and more accurately controllable uniform rate than is possible with a conventional valved conduit. It is limited in flow capacity to the maximum flow of finely divided solids that can be passed through the packing, without lifting it out of the bed. Size of the packing and vessel 13 must be selected accordingly. The packing, of course, forms a bed which exercises a frictional drag and control on the finer solids. With little or no aeration the packing forms a more or less fixed bed, resulting in a low flow rate of fine solids. This flow rate may be greatly increased by fluidizing the coarse solids 17, instead of keeping them immobile in the form of packing. The system of FIG. 1 is thus also suitable for low rates of throughput which ordinarily are difficult to control. As a variation of this scheme, the amount of coarse solids in vessel 13 can be changed by addition or withdrawal, to regulate the flow of fine solids.

A fluidizable coarse solids bed system is shown in FIG. 2. It may be used to serve as a check valve and prevent reversal of flow of fine solids. Here a mass or stream of fluidized solids of small particle size is shown as flowing downwardly in a conduit or standpipe 51 from a source of supply not shown. For example, the solids may be a powdered catalyst such as is widely used in conversion of hydrocarbon oils, or it may be finely divided coal, oil shale, limestone or ore, etc. As is well known in the art, these finely divided solids, preferably below about 400 microns in average particle diameter, are maintained in a fluidized condition by means of an aerating gas such as steam, air, hydrocarbon vapor, etc. supplied at appropriate points in conduit 51 as indicated at 53, 55.

When the system of FIG. 2 is used as a check valve it is quite effective to substantially prevent reverse flow in the event of unbalance in a fluidized solids system. For example, in one type of hydrocarbon conversion system utilizing the fluid solids technique, valves are sometimes omitted or left open and the flow of solids is controlled by balanced gas or vapor flow rates, e.g. as in United States Patent No. 2,589,124 to Packie. In the event of upset or unbalance, which sometimes happens, reverse flow might occur, permitting hydrocarbon gases from a reactor to flow into a regenerator where oxygen is present, or vice versa.

With the interposition of the flow control means of FIG. 2, in a system such as just described, reversal of flow or even a tendency toward reversal acts merely to defluidize the coarse solids bed and pack them tightly to effectively prevent downward flow of the fine solids therethrough. The finely divided solids effectively seal interstitial spaces so that reverse gas flow is substantially nil.

The finely divided solids in conduit or standpipe 51 are carried through a connection such as a U-bend or V-bend 56 into an upflowing conduit or riser 57 which also may be provided with one or more inlets for aerating gas as indicated at 59.

Flow rate of the fine solids may be controlled by conventional valve, or by regulating the amount of aeration or lift gas, or by other means. The purpose of the arrangement in FIG. 2 is to provide a check valve in this stream.

Hence, riser 57 is provided with a section of enlarged cross-section in the form of a vessel 61 having a flaring inlet at the bottom, preferably of conical or frusto-conical shape, as indicated at 63. A transverse grid or perforate plate or partition member is provided as indicated at 65. A bed 67 of relatively coarse solids such as metal or ceramic shot, beads, packing, or the like is supported upon grid 65.

When the fine solids are flowing from pipe 51 upwardly through vessel 61, the coarse packing offers relatively little resistance. The coarse particles are lifted so that the fines flow through easily. Height of the packed zone can be reduced to minimize this resistance. If the flow should reverse, the coarse packing or shot becomes tightly packed together, and effectively blocks the flow.

A desirable feature of the system is that it is automatic and responds instantaneously to a reversal of flow. This is particularly important in fluid solids systems where ordinary slide valves would be too slow acting, and may take 20–100 seconds to respond.

The coarse solids 67 have a considerably higher free-fall velocity than the finely divided solids and it is often preferable to use coarse solids of higher density than the fine material being fed. With proper choice of coarse solids a definite interface or upper level for the coarse solids bed may be established, as indicated at 69. Above this interface only the finer solids which are to be fed upwardly will be found. These may be fluidized or carried upwardly by the aerating gases in the upper part 71 of vessel 61.

One or more additional inlets 73 for aerating or fluidizing gas may be provided at or near the bottom of vessel 61 if desired. Additional aerating gas may be introduced into the upper part of vessel 61 through one or more inlets 75, if increased dispersion of the fine particles above the dense bed of coarse solids is desired. This may be used to decrease the solids density in riser 79, and thereby increase the flow rate of fine solids.

The upper part of vessel 61 connects through a reducer 77, preferably of frusto-conical shape, with the outlet of conduit 79. The latter may be led to any desired point. Additional aerating or conveying gas may be introduced through one or more inlets 81 into conduit 79.

FIG. 3 shows an arrangement for depressuring fluid solids without causing severe erosion of valves or other equipment, or undue attrition of the flowing solids. By proper choice of particle size, density and quantity, the coarse fluidized solids bed may be used as an effective pressure reducing means. Thus in certain types of catalytic apparatus wherein catalyst is under pressure at some stage and must be depressurized, this form of the invention has real utility. By using coarse metal shot of high density, e.g. steel, copper or alloy shot, etc. substantial pressure drops can be imposed without use of valves. The heavy coarse particles are suspended in the stream of finer solids, and increase the apparent bed density and static head.

For example, a vessel 90 may contain a normally fluidized bed 92 of metal shot having an apparent density of 125 pounds per cubic feet or a pressure gradient of about 0.87 pound per square inch for each foot of height. A bed 20 feet deep would have a pressure drop of over 17 pounds per square inch.

Fine solids may be fed in at the bottom through an inlet 91. They pass upwardly through the fluidized coarse particles in bed 92, from which they are elutriated into an upper zone 94. Zone 94 is larger in cross-section than bed 92, so that an interface or upper level for the coarse particles in their fluidized state is established as at 93. The fine solids, still fluidized in enlarged zone 94, may be withdrawn through a gravity line 96. Gaseous or vaporous products pass overhead through an outlet line 98. If fine particles are entrained in this stream they may be separated by use of a conventional cyclone or other gas-solids separator. The same is true in FIGS. 1 and 2.

It will be understood that the applications mentioned above are merely exemplary and that the present invention can readily be adapted to various fluid solids systems where balancing and/or control of solids flow and of fluistatic pressures causes operating difficulties. Valve erosion and replacement is a serious problem in some fluid solids systems. The use of a coarse bed of solids to replace or at least to supplement control valves tends largely to avoid prior art difficulties. It will be seen also, that the system can be operated with the coarse solids in relatively packed or unfluidized condition for some purposes and with the solids fluidized for other purposes.

It will also be understood that reference to gases, fluidizing fluids, etc., above is intended to cover the use of reactant gases, vapors, etc., as well as non-reactant fluids, including steam, air, inert gases, and the like. The relatively fine particles will usually range between 20 and 100 to 200 microns although they may go as high as 300 to 400 microns. The coarse particles will be definitely larger or be definitely more dense or both, than the coarsest fraction of the fine particles, so as to make possible a reasonably clean separation of the two in the beds where fine solids are elutriated from the coarse. It will be understood that both the fine and coarse solids may vary considerably in actual size. In general, the fine particles are completely and readily fluidizable, whereas the coarse particles need not be completely fluidizable in most cases. The particle free fall rate, according to Stokes' law, is a more important criterion than absolute particle size, and it will be understood that the terms "coarse" and "fine" have reference to this property as well as actual particle dimensions. Variations in the drop, e.g. in FIGS. 1 and 3, may be achieved by varying the inventory of coarse solids, for example by adding or removing metal shot, etc.

What is claimed is:

1. Apparatus for controlling the rate of flow of finely divided fluidized solids through conduit means to a separate zone of desired use, said conduit means including a standpipe provided at its lower end and with a U-bend, a vessel of larger diameter than said U-bend, an upwardly and outwardly flared inlet section connecting the upper end of said U-bend with the bottom portion of said vessel and a pipe leading from the upper portion of said vessel, a grid of substantially the same diameter as said vessel and arranged in the lower portion of said vessel, a fluidizable bed of coarse solids much coarser than said finely divided solids and contained in the lower portion only of said vessel and supported by said grid, said U-bend forming means whereby finely divided fluidized solids including fluidizing gas are introduced into the bottom portion of said upwardly and outwardly flared inlet section and below said grid only for passage upwardly through said grid and through said bed of coarse solids without removing said coarse solids from said vessel, whereby upon a pressure reversal in said U-bend the flow of fluidized solids is reversed and said coarse particles and finely divided particles defluidize in said bed and said coarse particles in said bed become tightly packed together and said finely divided solids seal interstitial spaces to act as a check valve and to prevent reverse flow of said fluidized finely divided solids in said conduit means.

2. Apparatus for controlling the rate of flow of finely divided fluidized solids through conduit means to a separate zone of desired use, said conduit means including a vertically arranged conduit of relatively small diameter, a separate aerating gas inlet connected to said relatively small diameter conduit, a vertically arranged vessel of larger diameter than said conduit, an upwardly and outwardly flared inlet section connecting the upper end of said conduit with the bottom portion of said vessel and a pipe leading from the upper end of said vessel, a grid of substantially the same diameter as said vessel and arranged in the lower portion of said vessel, a fluidizable bed of coarse solids much coarser than said finely divided solids and contained in the lower portion only of said vessel and supported by said grid, said conduit forming means whereby finely divided fluidized solids including fluidizing gas are introduced into the bottom portion of said upwardly and outwardly flared inlet section and below said grid only for passage upwardly through said grid and through said bed of coarse solids without removing said coarse solids from said vessel, whereby upon a pressure reversal in said conduit the flow of fluidized solids is reversed and said coarse particles and finely divided particles defluidize in said bed and said coarse particles in said bed above said grid become tightly packed together and said finely divided solids seal interstitial spaces to act as a check valve to prevent reverse flow of said finely divided solids in said conduit means.

References Cited in the file of this patent

UNITED STATES PATENTS

| | | |
|---|---|---|
| 2,393,636 | Johnson | Jan. 29, 1946 |
| 2,415,755 | Ogorzaly | Feb. 11, 1947 |
| 2,443,673 | Atwell | June 22, 1948 |
| 2,455,915 | Borcherding | Dec. 14, 1948 |
| 2,595,254 | Hemminger | May 2, 1952 |
| 2,621,034 | Stecker | Dec. 9, 1952 |
| 2,666,526 | Odell et al. | Jan. 19, 1954 |
| 2,774,661 | White | Dec. 18, 1956 |

OTHER REFERENCES

Hilditch: "Catalytic Processes in Applied Chemistry," Van Nostrand Co., 1929, vol. 2 (page 174 used).